United States Patent Office 2,856,887
Patented Oct. 21, 1958

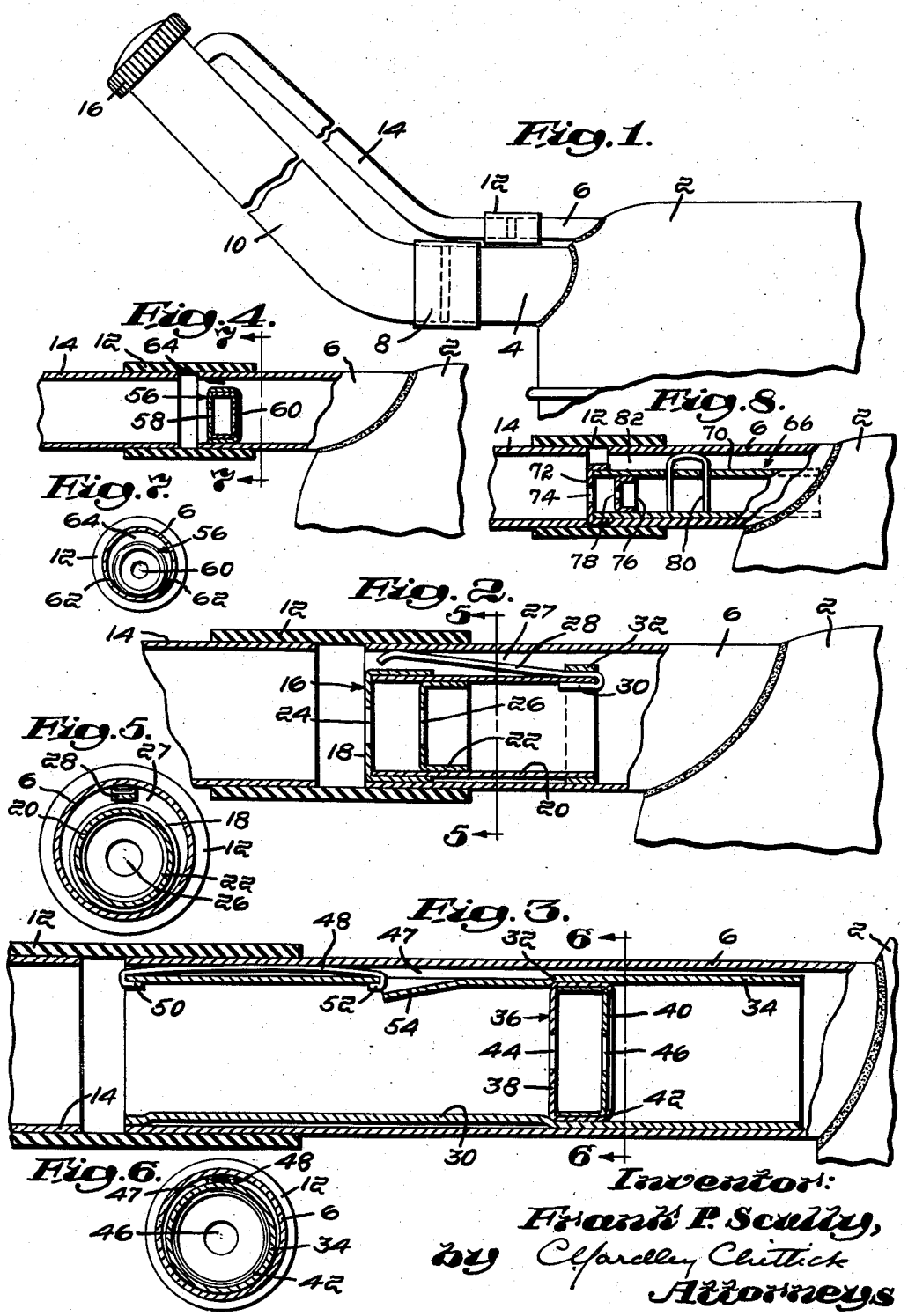

2,856,887

LIQUID LEVEL ALARM

Frank P. Scully, Belmont, Mass., assignor to Scully Signal Company, Melrose, Mass., a corporation of Massachusetts Application October 12, 1955, Serial No. 539,996

7 Claims. (Cl. 116—109)

This invention relates to the art of filling tanks. It is particularly concerned with the provision of means which will give a signal to the operator when the rising level of liquid in the tank has reached a predetermined point so that the operator will be advised to shut off the liquid supply before overflow has occurred through either the fill pipe or the vent pipe.

The invention is also directed toward the provision of a special type of signaling device which may be applied to conventional gasoline tanks of automobiles.

Another object of the invention is to provide a signaling device preferably in the form of the so-called button-type whistle which may be mounted in the vent pipe by the tank manufacturer or which may be inserted in the vent pipe by the automobile dealer or car owner as an accessory purchased especially for this use.

Another object of the invention is to provide a signaling device designed to be placed in the short vent-pipe stub that customarily extends substantially horizontally from the tank as supplied by the tank manufacturer to the car builder. The device, regardless of the form of whistle, will be of such dimensions that it will only partially block the vent pipe so that some of the venting gas will pass through the whistle to give the signal and the balance of the gas will flow through the bypass past the whistle. The total area of the two gas passages is such as to cause proper operation of the whistle without creating back pressure high enough to cause a blow-back in the fill pipe during filling at all normal rates, which at present do not exceed twenty gallons per minute. The invention further contemplates that the area of the bypass alone will be of such size that after the whistle aperture has been trapped by rising liquid, filling can continue until the tank has been completely filled without the creation of gas pressure in the tank which in terms of static liquid head would exceed the height of the entrance to the fill pipe above the tank. Thus with the liquid level above the lower end of the fill pipe as filling nears completion and with the fill pipe running full and the whistle orifice trapped so that all gas must escape solely through the bypass, the pressure in the tank will not exceed a pressure equal to the head from the liquid level to the entrance to the fill pipe. This arrangement of vent capacities insures against blow back through the fill pipe so long as the bypass is open and allows sufficient time for the operator to cut off the supply after the whistle has given its indication that the level has reached the whistle orifice.

Another object of the invention is the provision of a unitary article of manufacture which will act as a signaling device of low cost having certainty of performance over a wide range of filling rates. It is necessary that the signal be given at low rates of fill as well as at higher rates so that if the operator should, through force of habit, slow the filling rate as the filling approached completion the sound will continue normally until altered or cut off by the liquid rising to a predetermined level.

These and other objects of the invention will become more apparent as the description proceeds with the aid of the accompanying drawings in which—

Fig. 1 is a side elevation of a tank, broken away in part, having a fill pipe and vent pipe extending therefrom.

Fig. 2 is an enlarged side elevation partly in section showing the upper corner of the tank, the connected portions of the vent pipe, and the signaling device positioned in the vent-pipe stub.

Fig. 3 is a view similar to Fig. 2 to slightly larger scale, showing a modified type of signaling device in position in the vent-pipe stub.

Fig. 4 is another side elevation similar to Figs. 2 and 3 in which the signaling device is permanently affixed to the vent-pipe stub.

Fig. 5 is a vertical section on the line 5—5 of Fig. 2.

Fig. 6 is a vertical section on the line 6—6 of Fig. 3.

Fig. 7 is a vertical section on the line 7—7 of Fig. 4.

Fig. 8 is a view similar to Figs. 2, 3 and 4 showing the invention in still another embodiment.

As will be understood from the detailed explanation which follows hereinafter, the specific construction of the signaling device may be varied but in every case it will be positioned in the vent pipe at substantially full-level position, so that when the level in the tank reaches a predetermined point, the signal will first be altered and subsequently cut off. Thus the operator will know that the liquid level has risen to the said predetermined level and that the supply should be terminated.

Preferably, the whistle is positioned in that portion of the vent pipe which is in the form of a short stub permanently affixed to the tank as it is customarily manufactured but, if desired, the signaling device or whistle could be positioned in the second portion of the vent pipe immediately adjacent the end of the vent-pipe stub.

It will also be noted from the following explanation that the signaling device never completely blocks the vent pipe so that after the signal is changed, modified or cut off, there will still be a space for the remaining gas to pass by the signaling device until the operator cuts off the supply.

Referring to Fig. 1, there is shown a conventional automobile gasoline tank 2 manufactured with two stub pipes extending therefrom, the first a fill-pipe stub 4; and the second, a vent-pipe stub 6. Fill-pipe stub 4 is connected by a conventional hose connection 8 to the outer portion 10 of the fill pipe which leads to any desired exterior position on the automobile.

Similarly, vent-pipe stub 6 is connected by hose connection 12 to a second portion 14 of the vent pipe, the outer end of which may terminate at any suitable place. In the illustration of Fig. 1, it leads back into the upper end of the fill pipe 10. A conventional cap 16 closes the outer end of fill pipe 10.

Referring now to Fig. 2 which shows the vent-pipe stub 6 in enlarged detail, there is shown positioned therein a signaling device in the form of a button-type whistle 16. This whistle consists of a cup-shaped element 18, the cylindrical portion of which is in close-fitting engagement with a cylindrical tubular element 20. A second cup-shaped element 22 is positioned within element 20 and spaced from element 18 to form the button-type whistle. Elements 18 and 22 have centrally aligned apertures 24 and 26 of such dimensions that when gas displaced during filling the tank 2 passes therethrough, a substantial whistling sound will be produced which may be readily heard by the operator. The whistle is smaller than the stub 6 leaving a bypass 27.

At the right end of cylindrical element 20, as viewed in Fig. 2, a spring 28 has had its right-hand end 30 crimped around the end of the cylindrical element. Spring 28 is held securely in place by a cylindrical band 32. The left-hand end of spring 28 is bent in such manner that when the signaling device is positioned in the end of stub 6, it will press with sufficient force against the interior upper part of the stub to hold the signaling unit firmly in place.

After the signaling device 16 has been secured in position in stub 6 as shown, the stub is then connected to the other portion 14 of the vent pipe by the hose connector 12 in a manner well understood in the art.

The construction shown in Fig. 3 is similar to that in Fig. 2 as to the tank 2, the stub 6, the hose connection 12 and the other portion of the vent pipe 14. Likewise, the operation of the construction of Fig. 3 is the same as that of Fig. 2, the difference residing in the details of the construction of the signaling unit.

A cylindrical tubular element 30 is expanded slightly at 32 so that the right-hand tubular end 34 is a trifle larger than the left-hand portion. Shoulder 32 serves to locate a whistle or a signaling device 36, consisting of two cup-shaped elements 38 and 40 fitting one within the other with the rim 42 of element 38 flanged inwardly to hold element 40 in place. The outer cup 38 is in tight frictional engagement with tube 34. Aligned apertures 44 and 46 are of such size and spacing as to produce a clearly audible whistle when gas displaced from the tank passes therethrough on its way to the atmosphere.

It will be noted from Fig. 3 and the cross-sectional view in Fig. 6 that the cylindrical element 30 does not entirely fill the interior of stub 6 so that there is a by-pass 47 through which the displaced gas may flow after the apertures 44 and 46 have been trapped by rising liquid.

Any suitable means for securing cylindrical element 30 in position in stub 6 may be used. In the form shown there is a spring 48 having its left-hand end 50 crimped over the end of element 30 and its right-hand end 52 crimped over an end section produced by cutting and deflecting a portion of the tube downwardly as at 54. The friction between spring 48 and underside of stub 6 is sufficient to hold the signaling unit firmly in place.

A third form of the invention is shown in Fig. 4 in which the basic elements are the same as in Figs. 1, 2 and 3. Tank 2 has a stub 6 extending therefrom connected to the second portion 14 of the vent pipe by the hose connection 12. The signaling device or whistle 56 is made similarly to that shown in Fig. 3 and has aligned apertures 58 and 60 through which displaced gas flows to produce a whistling sound during filling. The whistle, however, is secured in stub 6 by soldering as at 62, shown in Fig. 7 and providing a by-pass 64. When this construction is used, it will ordinarily be assembled in the manner shown by the tank manufacturer, thereby to become standard equipment on the automobile with which it is used, whereas the constructions of Figs. 2 and 3 will ordinarily be in the nature of an accessory purchased and installed after the car has been sold by the manufacturer.

Another embodiment of the invention is shown in Fig. 8. The signaling device 66 comprises a tube 70 smaller in cross sectional area than stub 6 and capped at its end by one of the whistle parts 72 having a central aperture 74. The other whistle part 76 with aperture 78 is in the form of a cup positioned in force fit engagement with the tube interior.

An inverted U-shaped stiff wire 80 extended downward through two holes in the upper side of tube 70 with the wire ends resting on the bottom interior of the tube. The wire dimensions are such that when the device 66 is placed within stub 6 (second portion 14 being removed at this time) wire 80 will resiliently engage stub 6 and will act to hold the device firmly in place. The edge of whistle cap 72 will engage the end of stub 6 to limit inward movement.

The second portion 14 is then secured to stub 6 by hose connection 12, putting the signaling device in proper operative condition. As the tank is filled some of the gas passes through the whistle 72, 76 to give a signal and the balance of the gas flows through passage 82 between the exterior of tube 70 and stub 6. When the liquid level rises to the tube 70 to alter gas flow through the whistle, the sound is cut off or modified indicating to the operator that the tank is full. Gas may continue to flow through passage 82 while the liquid supply is being terminated.

With the knowledge imparted by the foregoing explanation, it will become obvious that other types of sound-producing devices might be used in place of the button-type whistles disclosed herein, and similarly other equivalent means may be used to hold the signaling devices in place in the vent pipe. It will be further understood that the configuration of the vent pipe and its dimensions may be varied at will without affecting the invention. However, in all cases there will be a permanently open bypass around the whistle so that gas may continue to escape after the whistle sound has been altered or stopped by rising liquid level.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. In combination, an automotive fuel tank, a fill pipe leading into said tank, a separate vent pipe extending from said tank to the upper part of said fill pipe, that portion of the vent pipe at the tank end thereof being substantially horizontal and connected to the tank at a point below the top thereof, a whistle having an orifice therethrough positioned in and secured against the lower side of said horizontal portion of said vent pipe with the axis of said orifice extending in the direction of the axis of said portion and located below the top of said tank, said whistle having an exterior cross-sectional area less than the interior cross-sectional area of said vent pipe at the position of said whistle thereby to provide a fixed bypass above said whistle, the combined areas of said whistle orifice and said bypass being such that during filling at normal rates there will be set up a back pressure in said tank high enough to force gas through said orifice in sufficient volume to cause said whistle to sound, the area of said bypass above said orifice being adequate to vent gas after said orifice has been trapped by rising liquid without creating a tank pressure which, in terms of static head, would exceed the height of the entrance to the said fill pipe above the tank.

2. The combination set forth in claim 1 in which that portion of the vent pipe on the tank side of the whistle provides the sole passage for gas leaving the tank during filling, said whistle orifice and bypass acting to divide the gas flow in proportion to their respective areas and that portion of the vent pipe on the discharge side of said whistle acting to receive the merging gases as they leave the whistle orifice and bypass.

3. The combination set forth in claim 1 in which said vent pipe is made in first and second sections, said first section being integral with said tank, the second section being separably connected to said first section, and said whistle is positioned in said first section.

4. In combination, an automotive fuel tank, a fill pipe leading into said tank, a separate vent pipe extending from said tank to the upper part of said fill pipe, said vent pipe being made in first and second sections, said first section being integral with said tank and extending substantially horizontally therefrom at a position below the top of said tank, said second section being separably connected to said first section, a whistle having an orifice therethrough positioned in and secured against the lower side of said first section with the axis of said orifice extending in the direction of the axis of said first section and located below the top of said tank, said whistle having an exterior cross-sectional area less than the interior cross-sectional area of said vent pipe at the position of said whistle thereby to provide a fixed bypass above said whistle orifice, said whistle being in the form of a separate insertable unit adapted to be placed in said first section when said first section has been disconnected from said second section and means for holding said whistle in secured position in said first section, the combined areas of said whistle orifice and said bypass being such that during filling at normal rates there will be set up a back pressure in said tank high enough to force gas through said orifice in sufficient volume to cause said whistle to sound, the area of said bypass above said orifice being adequate to vent gas after said orifice has been trapped by rising liquid without creating a tank pressure which, in terms of static head, would exceed the height of the entrance to the said fill pipe above the tank.

5. The combination set forth in claim 4, said means for holding said whistle in position in said first section comprising a tubular element related to said whistle and extending axially therefrom and a spring element connected to said tubular element for exerting a holding pressure against the interior wall of said first section.

6. A signaling device adapted to be positioned in the vent pipe of a tank comprising in combination a whistle having spaced walls and aligned apertures therethrough, a tubular element related to said whistle and extending axially therefrom and a spring element connected to said tubular element for exerting a holding pressure against the interior wall of a larger pipe in which said whistle and tubular element may be positioned.

7. In combination, a closed tank having a vent pipe integral therewith with its lower end extending substantially horizontally therefrom close to the top of said tank and with the major portion of the vertical cross-section of said horizontal part being below the top of the tank, and a whistle having an orifice therethrough positioned in the horizontal part of said vent pipe near the tank and blocking the lower portion of the passage through said horizontal part of said vent pipe and thereby providing a bypass above said whistle, said orifice being located below said tank top whereby during filling of said tank with liquid part of the displaced gas will flow through said orifice to give a sound and part of the displaced gas will flow through said bypass past and above said whistle and thereafter upon rise of liquid to a predetermined level the sound produced by gas flowing through said orifice will be altered while gas is still flowing through said vent pipe past and above said whistle.

References Cited in the file of this patent

UNITED STATES PATENTS

| | | |
|---|---|---|
| 2,140,559 | Scully | Dec. 20, 1938 |
| 2,152,459 | Biasco | Mar. 28, 1939 |
| 2,493,699 | Scully | Jan. 3, 1950 |
| 2,496,134 | Scully | Jan. 31, 1950 |
| 2,548,734 | Mathey | Apr. 10, 1951 |